US011093950B2

(12) United States Patent
Hersh et al.

(10) Patent No.: US 11,093,950 B2
(45) Date of Patent: Aug. 17, 2021

(54) CUSTOMER ACTIVITY SCORE

(71) Applicant: Opower, Inc., Arlington, VA (US)

(72) Inventors: Nancy Hersh, Washington, DC (US); Daniel Bloomfield Ramagem, Derwood, MD (US); Suryaveer Lodha, Berkeley, CA (US); Lawrence Han, Oakland, CA (US); Rachel Zuraw, Washington, DC (US); Kristy Mayer, Washington, DC (US)

(73) Assignee: OPower, Inc., Redwood Shores, CA (US)

( * ) Notice: Subject to any disclaimer, the term of this patent is extended or adjusted under 35 U.S.C. 154(b) by 1419 days.

(21) Appl. No.: 14/793,499

(22) Filed: Jul. 7, 2015

(65) Prior Publication Data

US 2016/0224987 A1 Aug. 4, 2016

Related U.S. Application Data

(60) Provisional application No. 62/111,046, filed on Feb. 2, 2015.

(51) Int. Cl.
*G06Q 10/00* (2012.01)
*G06Q 30/00* (2012.01)
(Continued)

(52) U.S. Cl.
CPC ....... *G06Q 30/016* (2013.01); *G06Q 30/0204* (2013.01); *G06Q 50/06* (2013.01)

(58) Field of Classification Search
None
See application file for complete search history.

(56) References Cited

U.S. PATENT DOCUMENTS

| 4,334,275 A | 6/1982 | Levine |
| 4,843,575 A | 6/1989 | Crane |

(Continued)

FOREIGN PATENT DOCUMENTS

| AU | 2010315015 | 7/2014 |
| CA | 2779754 | 5/2011 |

(Continued)

OTHER PUBLICATIONS

75. Christy M.K. Cheung, Matthew K.O. Lee, Xiao-Ling Jin et al. (Customer Engagement In An Online Social Platform: A Conceptual Model And Scale Development, Thirty Second International Conference on Information Systems, Shanghai 2011) (Year: 2011).*

(Continued)

*Primary Examiner* — Hafiz A Kassim
(74) *Attorney, Agent, or Firm* — Kraguljac Law Group, LLC

(57) ABSTRACT

Aspects of the subject technology relate to methods and systems for calculating a customer activity score (CAS). In some aspects, a method of the subject technology includes steps including aggregating behavior information for each of a plurality of utility customers, the behavior information including historic consumption data for at least one consumable resource, and calculating, and using the behavior information, a customer activity score (CAS) for one or more of the utility customers. In some aspects, the method can also include steps for generating customer content for at least one of utility customers based on a corresponding CAS value. In some aspects, systems and computer-readable media are provided.

20 Claims, 5 Drawing Sheets

(51) Int. Cl.
*G06Q 50/06* (2012.01)
*G06Q 30/02* (2012.01)

(56) References Cited

U.S. PATENT DOCUMENTS

| | | |
|---|---|---|
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,280,893 B2 * | 10/2007 | Spool ............... G06Q 30/02 700/291 |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,734,632 B2 * | 6/2010 | Wang ............... G06Q 30/02 707/749 |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,311,863 B1 * | 11/2012 | Kemp ............... G06Q 10/0639 705/7.11 |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,447,747 B1 * | 5/2013 | Yi ............... G06F 16/24578 707/705 |
| 8,478,447 B2 | 7/2013 | Fadell et al. |
| 8,489,245 B2 | 7/2013 | Carrel et al. |
| D687,445 S | 8/2013 | Fuhrmann |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 * | 8/2014 | Singh ............... G06F 21/81 702/182 |
| D714,335 S | 9/2014 | Cojuangco et al. |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| 9,607,507 B1 * | 3/2017 | McClintock ......... G08C 17/04 |
| 10,339,560 B2 * | 7/2019 | Bafna ............... G06Q 30/0246 |
| 2001/0047290 A1 | 11/2001 | Petras et al. |
| 2002/0065581 A1 | 5/2002 | Fasca |
| 2002/0116266 A1 * | 8/2002 | Marshall ............ G06Q 10/10 705/14.14 |
| 2002/0178047 A1 | 11/2002 | Or et al. |
| 2002/0198629 A1 | 12/2002 | Ellis |
| 2003/0009401 A1 * | 1/2003 | Ellis ............... G06Q 30/04 705/35 |
| 2003/0011486 A1 | 1/2003 | Ying |
| 2003/0018517 A1 * | 1/2003 | Dull ............... G06Q 30/02 705/7.32 |
| 2003/0023467 A1 | 1/2003 | Moldovan |
| 2003/0041037 A1 * | 2/2003 | Spool ............... G05B 19/042 705/80 |
| 2003/0216971 A1 | 11/2003 | Sick et al. |
| 2004/0024717 A1 | 2/2004 | Sneeringer |
| 2004/0044677 A1 * | 3/2004 | Huper-Graff ......... G06Q 30/02 |
| 2004/0078153 A1 * | 4/2004 | Bartone ............ H02J 13/00028 702/57 |
| 2004/0111410 A1 | 6/2004 | Burgoon et al. |
| 2004/0140908 A1 | 7/2004 | Gladwin et al. |
| 2005/0021389 A1 * | 1/2005 | Dias ............... G06Q 10/06393 705/7.39 |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0143071 A1 * | 6/2006 | Hofmann ........... G06Q 30/02 705/7.34 |
| 2006/0195438 A1 | 8/2006 | Galuten |
| 2006/0242154 A1 * | 10/2006 | Rawat ............... G06F 16/168 |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0244739 A1 * | 10/2007 | Soito ............... G06Q 30/02 705/7.29 |
| 2007/0255457 A1 | 11/2007 | Whitcomb et al. |
| 2007/0260405 A1 | 11/2007 | McConnell et al. |
| 2007/0260596 A1 * | 11/2007 | Koran ............... G06Q 30/02 |
| 2007/0260624 A1 * | 11/2007 | Chung ............... G06Q 30/02 |
| 2008/0027885 A1 | 1/2008 | van Putten et al. |
| 2008/0033587 A1 | 2/2008 | Kurita et al. |
| 2008/0065476 A1 * | 3/2008 | Klein ............... G06Q 30/02 705/14.13 |
| 2008/0167535 A1 | 7/2008 | Stivoric et al. |
| 2008/0177678 A1 * | 7/2008 | Di Martini ......... G01D 4/002 705/412 |
| 2008/0189632 A1 * | 8/2008 | Tien ............... G06Q 30/02 715/764 |
| 2008/0195561 A1 | 8/2008 | Herzig |
| 2008/0222561 A1 | 9/2008 | Helfman et al. |
| 2008/0244429 A1 | 10/2008 | Stading |

(56) References Cited

U.S. PATENT DOCUMENTS

| | | |
|---|---|---|
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0054092 A1* | 2/2009 | Stonefield .......... G06Q 30/0601 455/466 |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0004977 A1* | 1/2010 | Marci ...................... A61B 5/16 705/7.32 |
| 2010/0025483 A1 | 2/2010 | Hoeynck et al. |
| 2010/0057560 A1* | 3/2010 | Skudlark ................ G06Q 30/02 705/14.49 |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0169474 A1* | 7/2010 | Beckett, III ............ H04L 12/00 709/224 |
| 2010/0179704 A1 | 7/2010 | Ozog |
| 2010/0180223 A1 | 7/2010 | Speier |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1* | 8/2010 | Crabtree ................ G06Q 10/00 705/7.22 |
| 2010/0232671 A1 | 9/2010 | Dam et al. |
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1* | 1/2011 | Yates .................... G06Q 10/00 705/313 |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1* | 7/2011 | Bowman ................ G06Q 10/00 705/314 |
| 2011/0205245 A1 | 8/2011 | Kennedy et al. |
| 2011/0208585 A1* | 8/2011 | Daboll .................... G06Q 10/00 705/14.53 |
| 2011/0231320 A1* | 9/2011 | Irving .................... G06Q 30/00 705/80 |
| 2011/0245981 A1* | 10/2011 | Refai-Ahmed ......... G06F 1/206 700/282 |
| 2011/0251730 A1 | 10/2011 | Pitt |
| 2011/0251807 A1* | 10/2011 | Rada ...................... G01D 4/00 702/61 |
| 2011/0282505 A1 | 11/2011 | Tomita et al. |
| 2011/0302097 A1* | 12/2011 | Lonkar .................. G06Q 50/01 705/319 |
| 2011/0313964 A1 | 12/2011 | Sanchey Loureda et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0109709 A1* | 5/2012 | Fordyce, III ........... G06Q 30/02 705/7.29 |
| 2012/0109821 A1* | 5/2012 | Barbour ................ G06Q 40/02 705/44 |
| 2012/0173444 A1* | 7/2012 | Zik ........................ G06Q 10/10 705/317 |
| 2012/0179692 A1* | 7/2012 | Hsiao ................ G06F 17/30716 707/748 |
| 2012/0215369 A1 | 8/2012 | Desai et al. |
| 2012/0216123 A1* | 8/2012 | Shklovskii ......... G06Q 30/0201 715/738 |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2012/0316933 A1* | 12/2012 | Pentland ................ G06Q 30/02 705/14.1 |
| 2012/0330759 A1* | 12/2012 | Aggarwal ........... G06Q 30/0271 705/14.73 |
| 2013/0054758 A1* | 2/2013 | Imes .................... H04L 12/2827 709/219 |
| 2013/0060531 A1 | 3/2013 | Burke et al. |
| 2013/0060720 A1 | 3/2013 | Burke |
| 2013/0079938 A1* | 3/2013 | Lee ........................ G06Q 30/02 700/291 |
| 2013/0097177 A1 | 4/2013 | Fan et al. |
| 2013/0097481 A1 | 4/2013 | Kotler et al. |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2013/0346246 A1* | 12/2013 | Patel .................... G06Q 20/108 705/26.41 |
| 2014/0006314 A1 | 1/2014 | Yu et al. |
| 2014/0019319 A1 | 1/2014 | Derby et al. |
| 2014/0074300 A1* | 3/2014 | Shilts .................... G05D 23/01 700/276 |
| 2014/0107850 A1 | 4/2014 | Curtis |
| 2014/0143605 A1* | 5/2014 | Balla .................... G06F 11/2247 714/38.1 |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0246917 A1* | 9/2014 | Proud .................... H02J 17/00 307/104 |
| 2014/0278977 A1* | 9/2014 | Newton ............. G06Q 30/0255 705/14.53 |
| 2014/0337107 A1 | 11/2014 | Foster |
| 2015/0058423 A1* | 2/2015 | Chen .................... G06Q 50/01 709/204 |
| 2015/0227522 A1 | 8/2015 | O'Donnell et al. |
| 2015/0227846 A1 | 8/2015 | Mercer et al. |
| 2015/0235238 A1* | 8/2015 | Babinowich ....... G06Q 30/0202 705/7.31 |
| 2015/0254246 A1* | 9/2015 | Sheth .................. G06F 17/3053 707/728 |
| 2015/0267935 A1 | 9/2015 | Devenish et al. |
| 2015/0269664 A1 | 9/2015 | Davidson |
| 2015/0300831 A1 | 10/2015 | Sernicola |
| 2015/0310019 A1 | 10/2015 | Royer et al. |
| 2015/0310463 A1* | 10/2015 | Turfboer ............. G06Q 30/0204 705/7.33 |
| 2015/0310465 A1 | 10/2015 | Chan et al. |
| 2015/0319119 A1 | 11/2015 | Ryu et al. |
| 2015/0324819 A1* | 11/2015 | Lin ........................ G06Q 50/06 705/7.33 |
| 2015/0326679 A1 | 11/2015 | Lin et al. |
| 2016/0063560 A1* | 3/2016 | Hameed ............. G06Q 30/0264 705/14.61 |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |

(56) References Cited

FOREIGN PATENT DOCUMENTS

| | | |
|---|---|---|
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

Marcel van Birgelen, Benedict G.C. Dellaert, and Ko de Ruyter (Communication channel consideration for in-home services—The moderating role of customer participation, Journal of Service Management; vol. 23 No. 2, 2012). (Year: 2012).*

Jae Jeung Rho, Byeong-Joon Moon, Yoon-Jeong Kim, and Dong-Hoon Yang (Internet Customer Segmentation Using Web Log Data, vol. 2, No. 11; Journal of Business & Economics Research—Nov. 2004). (Year: 2004).*

International Search Report and Written Opinion for PCT Application No. PCT/US2015/038692, dated Sep. 24, 2015, 13 pages.

International Preliminary Report on Patentability for PCT Application No. PCT/US2010/055621, dated May 15, 2012, 8 pages.

International Search Report and Written Opinion for PCT Application No. PCT/US2010/055621, dated Dec. 23, 2010, 9 pages.

International Search Report and Written Opinion for PCT Application No. PCT/US2012/036539, dated Jul. 6, 2012, 8 pages.

International Preliminary Report on Patentability for PCT Application No. PCT/US2012/036539, dated Nov. 21, 2013, 7 pages.

International Search Report and Written Opinion for PCT Application No. PCT/US2013/046126, dated Aug. 22, 2013, 9 pages.

International Preliminary Report on Patentability for PCT Application No. PCT/US2013/046126, dated Jan. 8, 2015, 8 pages.

International Search Report for PCT Application No. PCT/US2014/036901, dated Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/20080728161614/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May 19, 2008, 15 pages, available at http://web.archive.orgi/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://www.ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.

Chen, Hanfeng, et al., "Testing for a Finite Mixture Model With Two Components," Journal of the Royal Statistical Society, Series B, vol. 66, No. 1, 26 pages, 2004.

De Prensa, Boletine, "TXU Energy Budget Alerts Give Consumers Control of Electricity Costs," TXU Energy, http://www.txu.com/es/about/press, 2 pages, May 23, 2012.

Deb, Partha, "Finite Mixture Models," Hunter College and the Graduate Center, CUNY NBER, FMM Slides, 42 pages, Jul. 2008.

D'Urso, M., et al., "A Simple Strategy for Life Signs Detection via an X-Band Experimental Set-Up," Progress in Electromagnectics Research C, vol. 9, pp. 119-129 (2009).

Eckmann, J.P., et al., "Ergodic theory of chaos and strange attractors," Reviews of Modern Physics, vol. 57, No. 3, Part I, pp. 617-656, Jul. 1985.

Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.

Fels, Margaret F., "PRISM: An Introduction," Elsevier Sequoia, Energy and Buildings, vol. 9, pp. 5-18, 1986.

Fels, Margaret F., et al., Seasonality of Non-heating Consumption and Its effect on PRISM Results, Elsevier Sequoia, Energy and Buildings, vol. 9, pp. 139-148, 1986.

Figueiredo, Vera, et al., "An Electric Energy Consumer Characterization Framework Based on Data Mining Techniques," IEEE Transactions on Power Systems, vol. 20, No. 2, pp. 596-602, May 2005.

Fitbit® Official Site, "Flex, One & Zip Wireless Activity & Sleep Trackers," http://www.fitbit.com/, 4 pages, Jul. 15, 2013.

Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_42835>.

Friedman, Jerome, et al., "Regularization Paths for Generalized Linear Models via Coordinate Descent," Journal of Statistical Sotfware, vol. 33, Iss. 1, pp. 1-22, Jan. 2010.

Gelber, Bob, "This Is Not a Bill," posted at Not a Mystery, posting date Apr. 18, 2015, available at http://notamystery.com/2015/04/18/not_worth_the_papeUts_printed_on/>.

Goldberg, Miriam L., et al., "Refraction of PRISM Results into Components of Saved Energy," Elsevier Sequoia, Energy and Buildings, vol. 9, pp. 169-180, 1986.

Jansen, R.C., "Maximum Likelihood in a Generalized Linear Finite Mixture Model by Using the EM Algorithm," Biometrics, vol. 49, pp. 227-231, Mar. 1993.

Jawbone, "Know yourself. Live better." https://jawbone.com/up/, 7 pages, Jul. 15, 2013.

Karsten, "Green nudge: The classic social comparison experiment by Opower," posted at iNudgeyou, posting date Nov. 28, 2012, available at http://inudgeyou.com/greennudgetheclassicsocialcomparisonexperimenbyopower/>.

Laskey, Alex, et al., "OPOWER," posted at ACM, posting date Jun. 2011, Copyright © 2015 by the ACM, available at http://xrds.acm.org/article.cfm?aid=1961687>.

Leisch, Friedrich, "FlexMix: A General Framework for Finite Mixture Models and Latent Class Regression in R," Journal of Statistical Software, http://www.istatsoft.org/, vol. 11 (8), pp. 1-18, Oct. 2004.

(56) References Cited

OTHER PUBLICATIONS

Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.
Mint.com, "Budgets you'll actually stick to," Budgeting—Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f..uelband, 7 pages, Jul. 15, 2013.
Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiiconsets/>.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

* cited by examiner

CUSTOMER ACTIVITY SCORE

CROSS-REFERENCE TO RELATED APPLICATIONS

This application claims the benefit of priority to U.S. Provisional Application Ser. No. 62/111,046, filed Feb. 2, 2015, entitled "CUSTOMER ACTIVITY SCORE," which is hereby incorporated by reference in its entirety.

BACKGROUND

Technical Field

Aspects of this disclosure relate to methods and systems for determining a level of user engagement, for example, with an online system or platform, and in particular, for calculating a customer activity score (CAS) for quantifying customer engagement with an online service or resource.

Introduction

Service providers, such as utility providers, could benefit from knowing more about their customers and in particular, customer engagement with their online services and/or program offerings. However, many utility providers collect limited amounts of customer information and therefore have poor insight regarding how to best manage their customer interactions.

SUMMARY

The following presents a simplified summary of one or more embodiments in order to provide a basic understanding of such embodiments. This summary is not an extensive overview of all contemplated embodiments, and is therefore not intended to identify key or critical elements of all embodiments nor delineate the scope of any or all aspects of the invention. Its sole purpose is to present some concepts of one or more embodiments in a simplified form as a prelude to a more detailed description, presented later.

Aspects of the technology relate to a computer-implemented method including steps for aggregating behavior information for each of a plurality of utility customers, the behavior information comprising historic consumption data for at least one consumable resource, and calculating, using the behavior information, a customer activity score (CAS) for one or more of the utility customers, wherein the CAS provides a quantitative measure of engagement with one or more online systems for one or more of the utility customers. In some aspects, the steps may further include generating customer content for at least one of utility customers based on a corresponding CAS value.

In another aspect, the subject technology relates to a system configured for calculating a customer activity score (CAS) for one or more customers. In some implementations, the system may include one or more processors, and a computer-readable medium comprising instructions stored therein, which when executed by the processors, causes the processors to perform operations comprising: receiving behavior information for each of a plurality of utility customers, the behavior information comprising historic consumption data for at least one consumable resource and calculating, using the behavior information, a customer activity score (CAS) for each of the plurality of utility customers. In some aspects the processors may be further configured to perform steps for segmenting the plurality of utility customers into two or more customer groups based on the CAS for each of the plurality of utility customers.

In yet another aspect, the subject technology can relate to a non-transitory computer-readable storage medium that includes instructions for receiving behavior information for each of a plurality of utility customers, the behavior information comprising historic consumption data for at least one consumable resource, and calculating, using the behavior information, a customer activity score (CAS) for each of the plurality of utility customers, wherein the CAS provides a quantitative measure of engagement with one or more online systems for the one or more of the utility customers.

BRIEF DESCRIPTION OF THE DRAWINGS

In the following description, reference is made to figures that show, by way of illustration, specific examples in which the subject technology can be practiced. It is understood that other aspects may be utilized and changes made without departing from the scope of the subject technology. In the figures.

DETAILED DESCRIPTION

Figure 1A:
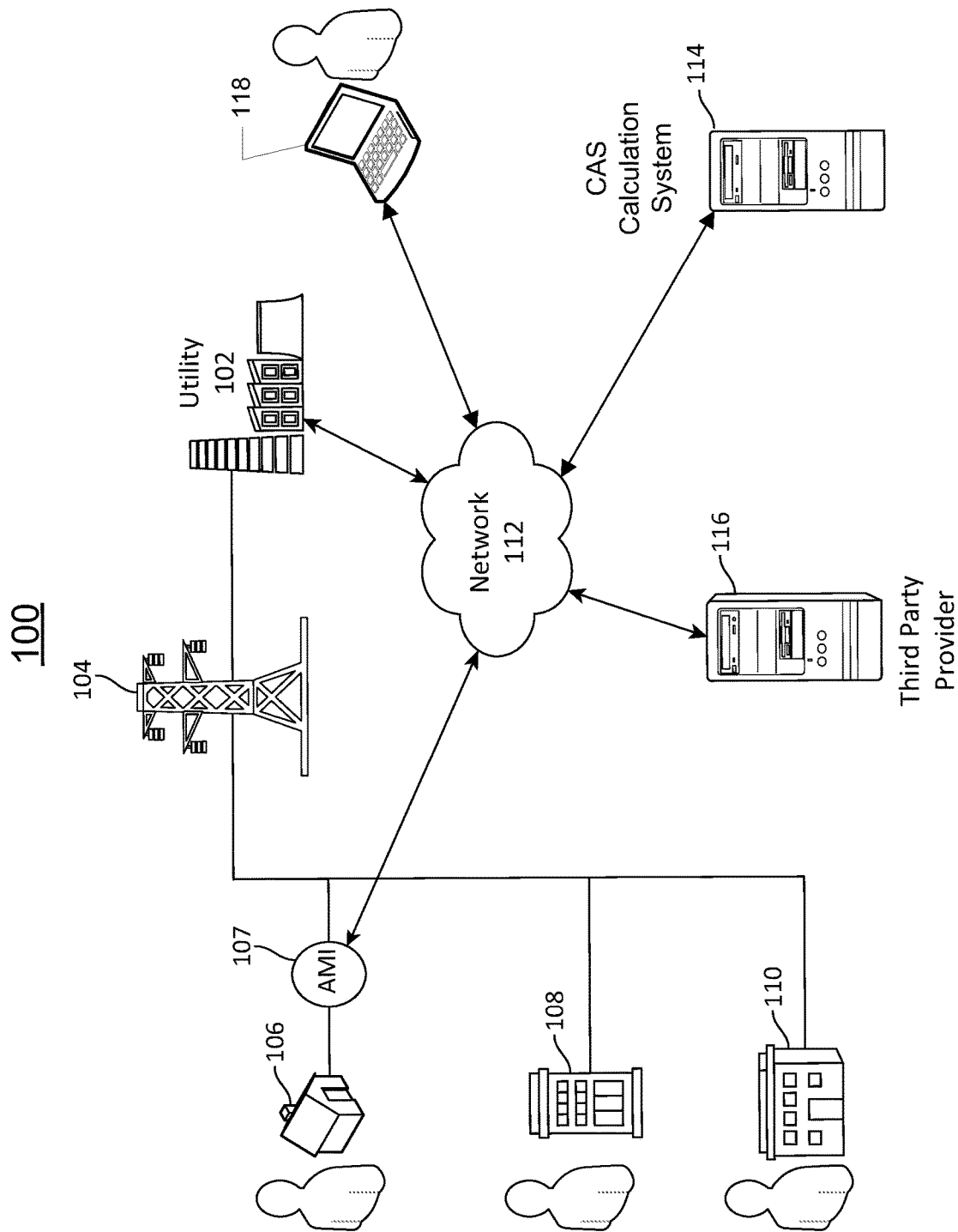
FIG. 1A. illustrates an example environment in which customer information can be collected and used to compute one or more customer activity score (CAS) values using a CAS calculation system.

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Problem and Solution

Aspects of the disclosure address the foregoing problems of utility provider/utility customer interaction by augmenting available information regarding customer behavior and engagement. In particular, aspects of the technology provide methods and systems for calculating a customer activity score ("CAS") that provides a quantitative measure of customer interaction with one or more online systems or programs, such as digital properties owned/operated by the utility provider and/or utility or third-party. By way of example, a CAS for a particular utility customer may reflect the customer's frequency and/or quality of interaction with a utility service, such as a utility website. In such approaches, more frequent use of a utility website (e.g., a power utility customer portal) could result in a higher CAS, as compared with less frequent use. Similarly, a 'quality' of user interaction with the website can be determined, for example, based on measures of the customer's level of website use. By way of example, a customer that only uses a provider website to check an account balance may be determined to have a less sophisticated interaction (i.e., a lower use level) as compared to a customer that uses the website to check his/her balance, register for one or more energy programs and submit online payments to the utility provider.

It is understood that CAS values can be calculated on a customer-by-customer basis and can indicate a quantity/quality of user engagement with multiple online programs or systems. By way of further example, a CAS can be based on customer interaction with one or more services and/or portals provided by a utility provider as well as one or more third party providers. In some approaches, CAS score values may be based on customer participation in utility programs, including but not limited to: points and rewards programs, rebate programs, appliance reuptake programs and/or energy efficiency programs, such as a behavioral demand response (BDR) service, designed to incentivize energy conservation using targeted user notifications. In some instances, CAS values may also reflect other types of user engagement with a utility service provider, such as call-center interactions, email interactions or inclusion in voluntary services/programs for which enrollment is accomplished via response to physical mailers or written election. In yet another approach, CAS values can be based on factors or attributes that correlate with a tendency towards utility engagement, such as ownership of a solar array, wind generator, and/or electric vehicle, etc.

Performing CAS Calculation:

As discussed in further detail below, CAS calculations for a particular user/customer can be performed using various behavioral and/or demographic signals. In some instances, behavioral information for a customer can provide a better indication of the customer's likely future decisions/behaviors. As such, behavioral information may be primarily used for the calculation of a CAS. It is understood that behavioral information can broadly encompass any information that directly or indirectly indicates a particular user action or behavior. By way of example, behavior information can include, but is not limited to, one or more of: resource use information, resource efficiency information, digital activity information, program participation status, bill payment method/status/history, etc.

CAS calculations can be performed in different ways, depending on a variety of factors, including the availability of behavioral information signals and weighted signal importance, etc. In some aspects, CAS calculations are performed using a machine-learning approach, such as by performing score calculation based on a dynamic CAS calculation model. In such approaches, the CAS calculation model is provided with inputs (e.g., behavior information signals), and used to output CAS values for one or more customers. In some aspects, calculated CAS values can be subsequently updated based on new or revised behavior information signals for a corresponding customer, or in response to the modification of one or more weights used to perform the CAS calculation.

CAS Use Cases:

Once CAS values have been computed and associated with various customers, CAS values can be used to improve customer experience by improving customer interaction with their utility provider and/or a third-party provider. In some implementations, CAS values may also be used to improve product development/deployment. By way of example, third-party information providers, such as those providing behavioral demand response services, may use CAS values to facilitate the segmentation and/or targeting of certain customers e.g., for the delivery of energy-efficiency related notifications. As described further with respect to aspects of the subject invention, segmentation can refer to the partitioning, grouping or identification of a subset of users/customers from a larger user pool. Likewise, targeting can refer to the selection of individual customers, or customer groups, for the delivery of notification content, such as BDR notifications encouraging energy efficient behaviors. As discussed in further detail below, customer CAS values can indicate that a particular customer is likely to be interested in receiving communications regarding rebate/savings or efficiency programs or participating in the programs. CAS scores can also be used to help determine what available communication channels may be used to communicate with a particular customer.

By way of example, customers associated with high CAS values may be more frequently engaged with digital communication devices, such as computers, smart phones or smart thermostat devices. As such, high CAS customers may be provided with message notifications, such as behavioral demand response (BDR) notifications, via short-message service (SMS), email, social media, and/or another digital means. In contrast, customers associated with low CAS values may be less likely to be reachable via digital communication channels or less likely to respond to digital communication channels. Accordingly, for low CAS customers, non-digital communication channels (e.g., physical mailers or interactive voice response) may be selected in addition to or instead of digital communication channels.

Customer CAS values can also be used to help formulate customer content, such as content provided in a BDR notification. For example, more explanation or details may be needed for customers with lower CAS values (e.g., less engaged customers) than for customers with higher CAS values (more engaged customers). In some instances, CAS values can be used as a metric for identifying similar/dissimilar users, since highly engaged (high CAS) customers may share many of the same qualities with one another. As such, CAS values may be used to identify two or more users for comparison in a targeted BDR notification.

In another example, CAS values can be used to determine types of content that would be of interest to a corresponding customer. Due to their higher degree of engagement activity, high CAS customers may be better candidates for inclusion in advanced enrollment programs, such as energy efficiency programs (e.g., BDR programs). As such, program solicitation may be performed based on CAS score level in which customers above a particular CAS threshold are provided solicitations or offers that are not provided to low CAS customers.

In yet another aspect, CAS values may be used for internal product or system diagnosis. Because CAS values can reflect a quality/quantity of user engagement, CAS values may be used as a way to determine product success or efficacy e.g., by providing a measure of user engagement with certain products. In some implementations, trends in user CAS values can be used to compare different products and/or services. By way of example, utility providers can use CAS values (and value changes) to evaluate different user interfaces (UI's) e.g., for an online customer portal. In one approach, different groups of customers with similar initial CAS values may be provided with online utility management portals with different UIs. Subsequently, metrics for CAS scores for each group may be tracked to see if one particular group is more engaged than the other (e.g., having higher average CAS values) indicating that one UI implementation may be preferable to another.

FIG. 1A illustrates an example environment 100 in which customer information can be collected and used to compute one or more customer activity score (CAS) values using a CAS calculation system. Environment 100 depicts a resource provider infrastructure (e.g., utility 102 and power grid 104), that is electrically and communicatively coupled with multiple customer sites, e.g., home 106 and businesses 108, 110, respectively. Utility 102 is also communicatively coupled to a communication network (network 112), user device 118 and multiple processing systems, e.g., third party provider 116 and CAS calculation system 114. It is understood that environment 100 provides example devices and a communication topology that could be used to implement certain aspects of the subject technology, however other configurations can be used without departing from the scope of the invention. For example, environment 100 can include a greater (or fewer) number of resource consumers (e.g., corresponding with consumer sites 106, 108, and 110), and/or a greater/fewer number of resource providers (such as utility 102) and computing systems (114, 116).

In the illustrated example of environment 100, utility 102 represents a power utility, however, it is understood that utility 102 can represent a provider of various resource types such as water and/or gas. In turn, CAS calculation system 114 and third party provider 116 are respectively depicted discrete computing systems, however each may be implemented using a distributed hardware and/or software implementations, for example, employing data centers or distributed computing systems or clusters.

In practice, customer information for customers associated with a particular consumption site (e.g., 106, 108, or 110) and/or network device (e.g., 118) is aggregated by CAS calculation system 114. Customer information can take various forms and can include various types of information, such as, demographic/profile information and/or behavior information. Examples of demographic/profile information can include, but are not limited to indications of customer: location, neighborhood, aggregated neighborhood demographic information, dwelling type, dwelling size, dwelling ownership status, average utility bill amounts, etc. It is contemplated that in some implementations customers may provide certain demographic/profile information and ask for segmentation based these signals in order to provide more helpful and customized content. If the customer provides permission, the demographic/profile information may be securely stored, used only for permitted uses, and accessed/deleted by the customer.

In contrast, to demographic information, customer behavior information provides indications of customer behaviors or habits. Examples of customer behavior information can include, but are not limited to: resource consumption history, consumption patterns/habits (e.g., power consumption), enrollment in resource (e.g., energy) conservation programs, etc. In some aspects, behavior information can also include signals regarding a customer's digital interaction with one or more online services or systems, such information can include data regarding: frequency of use (e.g., with respect to email, customer portals, online services, etc.), how long a customer remained engaged with a utility provider website or portal, user interactions with particular website elements or features, and/or customer use of online bill payment functionality, etc.

Customer information, including behavior information and demographic information can be collected (and provided) by a variety of sources. As illustrated with respect to environment 100, customer information can be collected by a resource provider (e.g., utility provider) 102 or a third-party information/services provider (e.g., third-party provider 116). In some aspects, customer information can be collected directly, for example, using an advanced metering infrastructure (AMI) device, such as AMI 107. Subsequently, customer information is provided to CAS calculation system 114, for example, via a private or public computer network, such as network 112 (e.g., the Internet).

In the example of FIG. 1A, customer data is aggregated by one or more of: utility 102, third party provider 116, and/or collected directly by CAS calculation system 114, for example, using a metering device such as AMI 107 or a smart thermostat device (not shown). However, it is understood that customer data can be collected from other sources, such as public registries, advertising agencies, and/or online databases, depending on the desired implementation.

Although CAS calculation can be performed using different types of customer information (i.e., demographic information and/or behavior information), some types of information may be more useful in performing CAS score calculation. In some cases, behavior information can be preferable to demographic information and may be used more heavily for CAS calculations.

By way of example, behavior information for a first customer associated with residence 106 can be collected directly by CAS calculation system 114 (e.g., via AMI device 107 and network 112) or alternatively from the utility 102. Behavior information for the first customer can also be received from third party provider, e.g., indicating the first customer's engagement with online services pertaining to his/her energy consumption. Additional behavior information may also be received by CAS calculation system 114 from utility 102, indicating the first customer's bill pay practices (e.g., online bill pay activities, payment method, payment timeliness, etc.). By way of example, behavior information regarding a user's online engagement (e.g., with user device 118) can be collected by utility 102 and/or a third-party provider 116 and provided to CAS calculation system 114. Alternatively, in some embodiments, behavior information may be collected directly by CAS calculation system 114. As discussed above, behavior information regarding a user's online activity may include data indicating various metrics regarding the user's interaction with one or more websites or web portals (e.g., a web portal for the user's utility provider).

Aggregated behavior information collected for the first customer can be used to calculate a CAS value for the first customer, indicating a quality and/or quantity of the first customer's engagement level. That is, higher CAS values correspond with greater levels of customer engagement, for example, with one or more online programs, bill payment etc., that are provided by a third-party (e.g., third party provider 116) and/or a utility provider (e.g., utility 102). Conversely, smaller CAS values are correlated with a lower degree of customer engagement.

By way of example, the first customer associated with residence 106 may be determined to have a CAS value of '12,' based on his/her participation in a BDR program offered by third party provider 116, as well as use of online bill-pay features provided by utility 102. In contrast, a second customer, associated with business 108, may be determined to have a lower CAS value (e.g., '7') based on his/her participation in a BDR program offered by third party provider 116, but lack of online interaction (such as online bill pay) with utility 102. As such, the first customer (having the higher CAS) can be identified as a more highly 'engaged,' customer as compared to the second customer with the lower CAS. As discussed in further detail below, customer CAS values can also be used to perform other functions, such as to facilitate customer segmentation and/or targeting, notification content generation, and/or communication channel selection, etc.

Figure 1B:
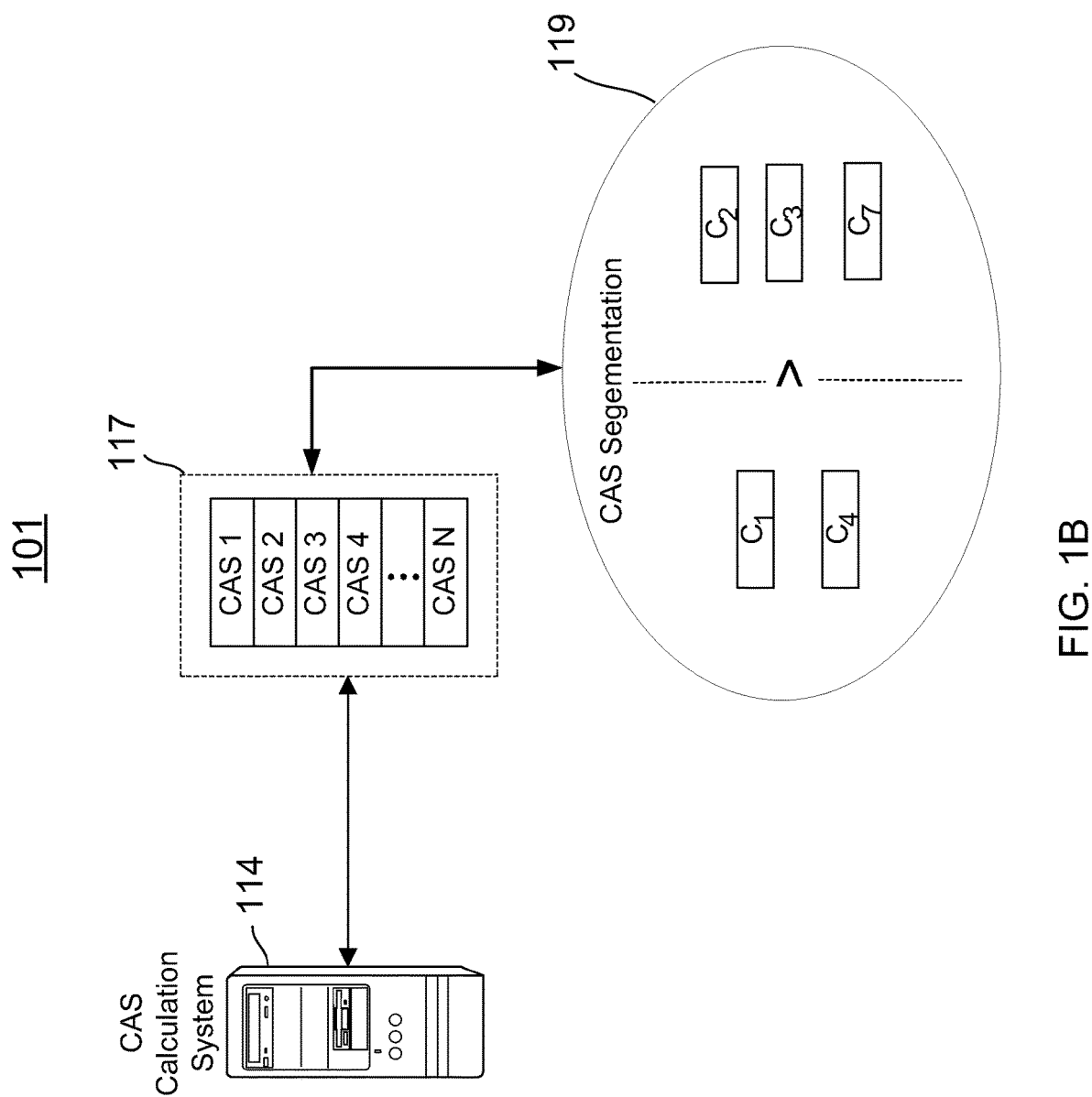
FIG. 1B conceptually illustrates an example environment including a CAS system and database in which segmentation is performed based on associated customer CAS values.

FIG. 1B illustrates an example environment 101 including a CAS system and database in which segmentation is performed based on associated customer CAS values. As illustrated by environment 101, CAS calculation system 114 includes a CAS database 117 that stores results for various CAS value calculations for a variety of customers, such as power utility customers. As depicted, CAS database 117 can include virtually any number of customer/CAS value pairs, each of which provide an indication of engagement for the respective customer. In the provided example, the computed CAS values (e.g., CAS 1 ... CAS N) can be associated with a particular customer identifier (e.g., $C_1 \ldots C_N$). As further depicted in CAS Segmentation window 119, CAS database 117 can be organized to sort or segment customers on the basis of their associated CAS value. It is understood that although example environment 101 provides an example wherein a single CAS value is calculated for each of a plurality of customers, a greater number of CAS score calculations are contemplated. For example, two or more CAS score values may be calculated for a single utility customer, for example, at different times or in response to the occurrence (or non-occurrence) of particular events (e.g., registration for a new incentive program or purchase of an electric vehicle, etc.).

Although CAS segmentation can be performed in a variety of ways, in some aspects customers may be sorted into two or more groups using a separating threshold CAS value (e.g., a raw CAS score, a CAS percentile, or a CAS rank among a customer base). Further to the example of FIG. 1B, customers $C_1$, $C_2$, $C_3$, $C_4$, and $C_7$ are segmented into two groups using a single threshold, above which includes customers $C_1$ and $C_4$, and below which includes customers $C_2$, $C_3$, and $C_7$. In FIG. 1B, a single threshold is illustrated, however, in other implementations, additional thresholds or ore other methods of CAS segmentation may occur in other ways. Additionally or alternatively, the CAS score may be used in combination with other signals (e.g., location, utility provider, customer profile information, enrollment/participation in specific programs, etc.) to segment a customer base into one or more groups.

Customer segmentation, as in the foregoing example, can be performed for a variety of reasons. In some implementations, customer segmentation may be performed to separately identify groups of customers that receive corresponding notification content, such as BDR notifications, promotional materials for energy savings programs, or advertisements for new products. By way of example, a higher CAS customer group may be a candidate for promotions relating to products/services for 'advanced' or highly-engaged customers, such as inclusion in a BDR program. BDR programs can be expensive to run and, as a result, targeting the BDR programs to customers that would likely participate would increase the efficiency and effectiveness of the BDR programs. Further to the illustration of FIG. 1B, segmentation may be used to identify customers $C_1$ and $C_4$ for inclusion in an energy efficiency program, whereas customers $C_2$, $C_3$, and $C_7$ may be recommended to a utility provider as candidates to receive promotional materials providing instructions to facilitate online bill payment of utility charges or otherwise increase their engagement with a utility (e.g., login to a utility portal to view their energy usage, etc.). Accordingly, customers with low engagement may be encouraged to increase their engagement with their utility. In this example, in addition to increasing customer engagement, by encouraging customers to pay their bills online, utilities can reduce the cost to serve these customers since it is often less expensive to the utility than mailing a customer a bill and processing forms of physical payment.

In another example, customer segmentation may be used to determine groups of customers that could be interested in (or eligible for) specific services, such as home energy audits, refrigerator recycling and/or solar-panel installation recommendations, etc.

In other use cases, CAS segmentation can be tracked over a period of time. That is, CAS values for one or more customers may be updated and tracked to determine how customer engagement is affected by changes in utility interaction or product design (e.g., whether a single customer's CAS increases or decreases or whether a group of customers' CAS increases or decreases over time). As such, CAS values can be used to provide internal feedback regarding product success and effectiveness with different customer groups. By way of example, a third-party provider, such as a behavioral demand service provider, may track CAS values for various customer segments. By correlating product deployment with each customer segment, the success/failure of those products may be measured by increases or decreases in the corresponding CAS scores for those segments.

Further to the example provided by FIG. 1B, a third-party provider of BDR notifications may provide different content in a series of home energy reports provided to each segmentation group (e.g., customers $C_1$ and $C_4$, in a first group; and customers $C_2$, $C_3$, and $C_7$ in a second group). By tracking metrics for CAS values for the customers of each group (e.g., an average CAS value for each group) the efficacy of each report type may be determined. Although the example above discusses the use of CAS values to compare the efficacy of report types, in other examples, CAS values may be used to compare different utility programs, campaigns, third-party vendors/service providers, or any other variable that may affect customer engagement. Further implementation examples relating to the use of CAS values are described with respect to CAS calculation and deployment methods of FIGS. 2A and 2B, discussed below.

Figure 2A:
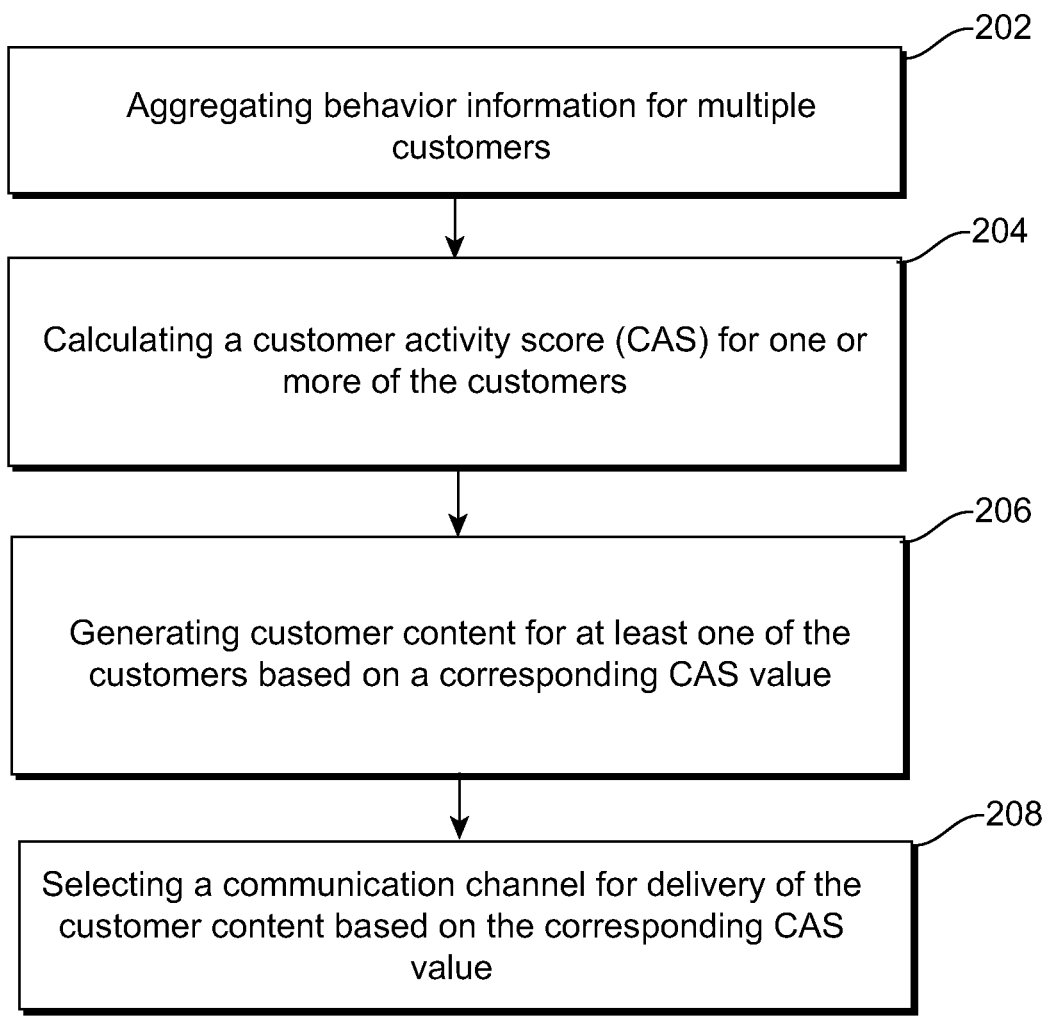
FIG. 2A illustrates steps of an example method for calculating CAS values for one or more customers and generating customer content based on the CAS values.

FIG. 2A illustrates steps of an example method for calculating CAS values for one or more customers and generating customer content based on the CAS values. Although method 200 in FIG. 2A includes a number of steps, other implementations, other methods may include additional steps, fewer steps, or alternative steps. At step 202, behavior information is aggregated, for example, by a CAS calculation system, such as that described with respect to FIG. 1A. As discussed above, other types of information can also be aggregated (such as profile/demographic information). Aggregated behavior information can be received from virtually any source, such as a third-party provider, a utility provider, or directly via a metering/smart thermostat device, etc. Examples of a third-party provider can include an information provider associated with the utility, such as a BDR notification provider or energy campaign provider. However, in other implementations, third-party providers could include parties that provide information regarding online metrics or demographic information, such as an advertising company.

After behavior information is aggregated/received by a CAS calculation system, method 200 proceeds to step 204 in which a customer activity score (CAS) for one or more customers is calculated based on the behavior information. CAS values can be calculated for each customer based on his/her respective behavior information, wherein higher CAS scores correlate with a greater degree of user engagement with a utility and/or associated providers (such as a BDR notification service). As discussed above, types of customer engagement reflected in behavior information can include energy usage information (e.g., an amount of energy consumed, consumption times, consumption efficiency or rank among similar customers, etc.), digital activity (e.g., online engagement statistics, usage of utility website/portal, usage of a utility application, program, functionality, or service, and/or email engagement indications, etc.), and program participation (e.g., participation in home energy audits, BDR programs, recycling opportunities, etc.).

In some aspects, energy usage information is collected by the utility provider and supplied in the form of periodic consumption amounts, such as load-curve data indicating power use on a month-to-month, day-to-day, or hourly basis. Power consumption data can also be supplied at shorter time intervals (e.g., on a minute-by-minute basis) when provided by a smart device, such as an advanced metering infrastructure device (AMI) device.

Digital activity information can be collected by a utility provider and/or a third-party provider and can include data regarding a customer's online behavior, including a frequency of email engagement (e.g., whether a customer opens an email, responds to an email, or selects links in an email), website or online portal usage statistics (e.g., how many times, when, or how often a customer logs in, actions that a customer performs, etc.), and/or information regarding a customer's response to digital advertising or promotional materials. In some aspects, program participation information may overlap with digital activity information, for example, with respect to customer participation in an energy savings program elected through an online portal or web interface. In other aspects, program participation may be indicated by a customer through non-digital means, such as via a response to a physical mailer indicating the customer's participation election.

By way of example, behavioral information for a particular customer may be collected using one or more of the foregoing sources. That is, behavioral information may reflect customer behaviors based on a combination of data including his/her energy usage (e.g., as collected by an AMI device), use of a utility provided electronic bill-pay service, and election of a recycling program, that is, indicated via physical mailer.

In step 206, customer content is generated for at least one of the customers based on a corresponding CAS value. Although content generation can be based on a number of factors, such as user demographic information, in some aspects CAS values can be used to determine the selection and arrangement of information provided to a corresponding customer. In some implementations, content generation for customers associated with higher CAS values can include information (such as energy savings tips) that may be considered more relevant for "advanced" users, i.e., users that have a history of engaging in energy conservation efforts or behaviors. Conversely, content generation for customers associated with lower CAS values can include basic information (e.g., for paying an energy bill online) that may be considered relevant for "novice" users. In the foregoing examples, it is assumed that CAS values correspond with customer aptitude with respect to interaction with online systems or participation in energy savings programs, i.e., that higher CAS customers may be considered more advanced due to their generally higher level of engagement. However, other considerations may be considered in determining content generation, depending on the desired implementation.

In step 208, a communication channel is selected for the delivery of customer content for at least one customer based on the CAS values calculated in step 204. Depending on implementation, one or more communication channels can be used (by a utility or third party provider), to provide communications to a customer. Some communication channels may include one or more of: physical mailers, interactive voice response (IVR) communications, emails, text messages (e.g., SMS messages), and/or on-device notifications (e.g., delivered to an in-home device, such as a smart thermostat).

In some aspects, a customer's CAS value provides an indication as to the most effective communication channel that may be used to communicate with the customer. For example, higher CAS values (indicating greater general customer engagement) may correlate with a high likelihood of customer response/engagement for certain communication channels, such as using text message/s or email/s. Conversely, low CAS values can correlate with higher likelihoods of customer response/engagement for different communication channels, such as telephone calls, physical mailers or visits to a customer consumption site (e.g., by a utility representative). Thus, calculated CAS values for a particular customer may be used determine a preferred communication channel for that particular customer.

In another aspect, customer CAS values may be used to vary a message or communication that is provided within the same communication channel. That is, a particular communication channel may be selected for a user based on his/her previous engagement with a utility provider (or indicated preferences). However, changes in the customer's CAS score (or CAS score differences between customers) may be used to vary the content delivered via the selected communication channel. By way of example, a digital communication channel may be used to deliver website content to different customers, wherein highly engaged customers (e.g., with high CAS values) may be provided with one content version of the website. In contrast, poorly engaged customers (e.g., with lower CAS values), may be provided with a different content version (e.g., content to help them to become more engaged, such as instructions about how to pay utility bills online).

Figure 2B:
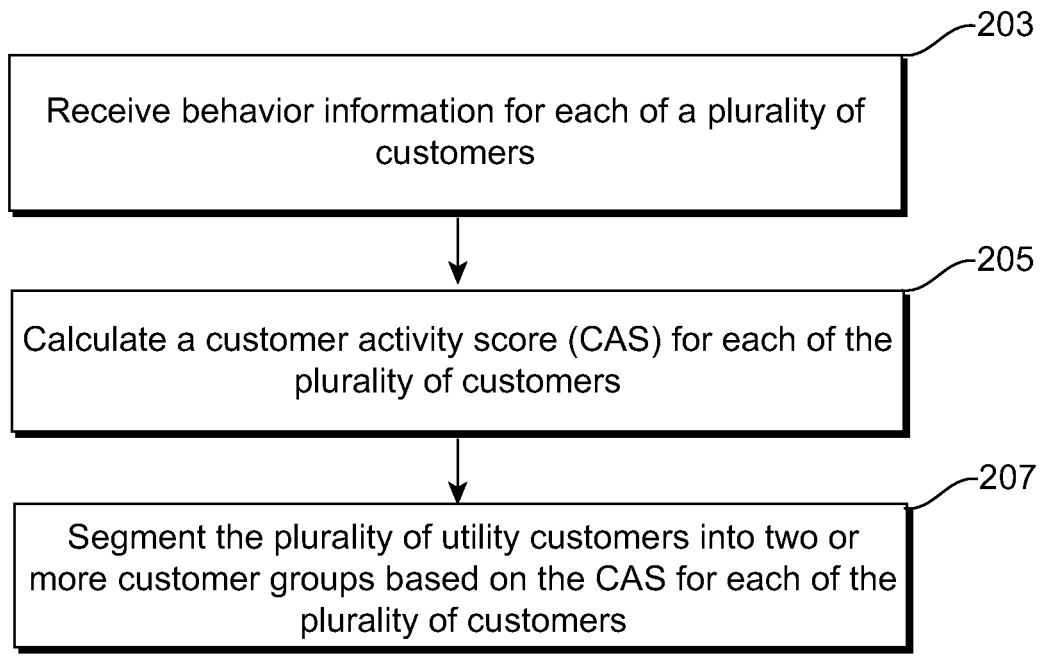
FIG. 2B illustrates an example method for calculating customer CAS values and segmenting utility customers into distinct groups based on corresponding CAS value.

FIG. 2B illustrates an example method 201 for calculating customer CAS values and segmenting utility customers into two or more groups based on the corresponding CAS value for each. Method 201 includes step 203 in which behavior information for each customer is received, e.g., by a CAS calculation system, such as CAS calculation system 114. As discussed above, aggregated behavior information can be received from virtually any source, such as a utility provider, or directly via a metering/smart thermostat device, etc.

At step 205, a customer activity score (CAS) is calculated for each of a plurality of customers, e.g., based on the behavior information. As discussed above, types of customer engagement reflected in behavior information can include energy usage information, digital activity information, and/or program participation information (e.g., participation in home energy audits, BDR programs, recycling opportunities, etc.). In some implementations, CAS score calculation can also be performed based on profile information (e.g., demographic information) indicating various customer attributes, such as location, neighborhood, aggregated neighborhood demographic information, dwelling type, dwelling size, dwelling ownership status, etc.

According to one aspect, the CAS calculation system 114 may generate a CAS score for a customer based on a weighted sum of various factors or signals that correspond with particular user behaviors. One example calculation may be in the expression of equation 1:

$$\text{CAS Score} = (w1 \cdot s1) + (w2 \cdot s2) + (w3 \cdot s3) \qquad \text{Equation (1)}$$

where s1, s2, and s3 are signals indicating a behavior reflecting user engagement (e.g., whether a customer pays bills online, a number of times he/she signed in to a utility portal, an indicator of customer enrollment with utility programs, indications that a customer has viewed content related to appliance recycling or rebates, whether a customer opens or responds to emails, resource usage efficiency rank, etc.). In turn, w1, w2, and w3 are weights assigned to the signals.

In some aspects, weighting (e.g., for w1, w2, and w3) may be configured, for example, by a user or administrator, based on the corresponding strength or value of a corresponding signal. In one such example, if a signal (e.g., s1) associated with weight w1 is considered to be a better indicator of customer engagement as compared to s2, then w1 can be configured such that w1>w2 (such that fluctuations is s1 can have a greater effect on CAS than similar fluctuations in s2). Although the foregoing example provides one illustration as to how a CAS score may be calculated using a weighted sum, other calculations may be implemented without departing from the scope of the invention.

In step 207, the customers can be segmented into two or more customer groups based at least on the corresponding CAS value for each customer. As described with respect to FIG. 1B, segmentation can be performed based on a threshold CAS value, for example, that is predetermined or configured by a system administrator.

Customer segmentation can be used to facilitate a variety of content generation, content delivery and product diagnostic features. For example, generated content for low CAS value customers may include tips or suggestions for improving their interaction with an online platform provided by their utility providers. In some approaches, actions that would increase a customer's CAS value may be identified and provided as recommendations, such as in instructions for performing online bill pay or completing registration for a home energy audit.

In another example, customer segmentation may be used to facilitate the selection of customers and/or communication channels for information delivery, as discussed above. In some aspects, a low CAS value may indicate a greater difficulty in reaching a customer (e.g., based on a general low-level of customer engagement); as such, low CAS customer segments may be provided notifications using multiple communication channels (e.g., email and physical mailers).

In yet another example, CAS values for various customer segments may be used to evaluate internal product design or efficacy. For example, changes to product features (such as BDR notification timing or content) can be modified and compared to changes in CAS values for a particular customer segment. In this way, design choices and product updates may be informed by CAS values.

Figure 3:
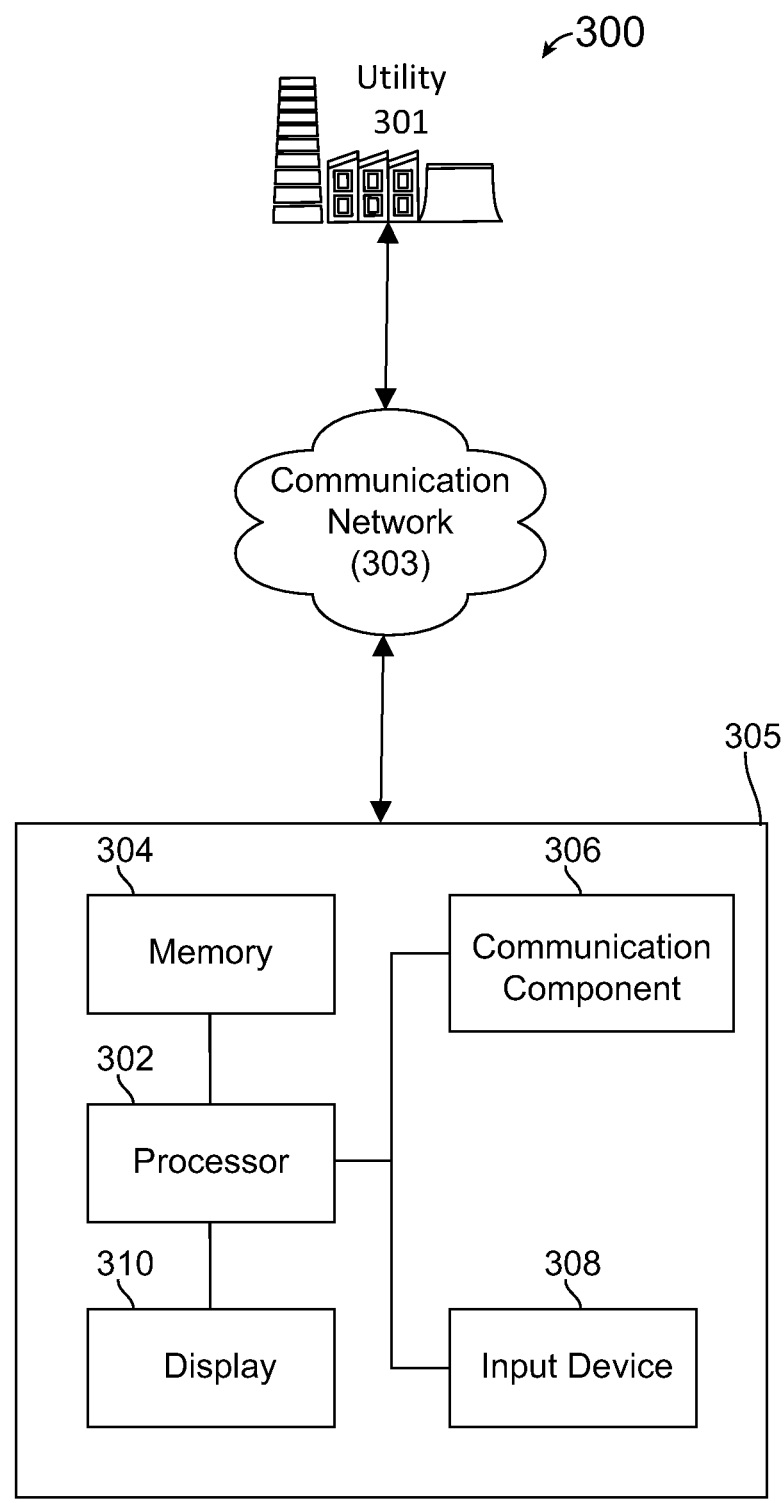
FIG. 3 illustrates a conceptual block diagram of hardware components used to implement a CAS calculation system, according to some aspects of the technology.

FIG. 3 illustrates an example environment 300 in which customer information (e.g., behavior information and/or profile information) can be collected e.g., from a utility and provided to customer activity score (CAS) calculation system 305 according to some aspects of the technology. Environment 300 includes a utility 301 communicatively connected CAS calculation system 305, e.g., via communication network 303. CAS calculation system 305 includes processor 302 for executing instructions stored in memory device or element 304. The instructions can cause computing device 305 to execute a computer-implemented method, for example, to calculate a CAS value for one or more utility customers.

As would be apparent to one of skill in the art, computing device 305 can include various types of memory, data storage, and/or non-transitory computer-readable storage media, such as a first data storage for program instructions for execution by the processor 302, a separate storage for usage history or user information, a removable memory for sharing information with other devices, etc. Computing device 305 can also include one or more communication components 306, such as a Wi-Fi, Bluetooth®, radio frequency, near-field communication, wired, and/or wireless communication systems, etc.

Computing device 305 can communicate with a network (e.g., network 303), such as the Internet, and can be configured to communicate with other such devices, such as one or more smart thermostat device, demand response devices, and/or AMI metering devices. Computing device 305 may also include at least one input device 308 configured to receive input from a user. Such inputs may include, for example, one or more push button/s, touch pad/s, touch screen/s, wheel/s, joystick/s, keyboard/s, a mouse, keypad/s, or other such devices or elements enabling a user to input a command to the device. In some aspects, however, such a device may not include any buttons at all, but rather controlled through a combination of visual and audio commands, such that a user can manipulate data input to the device without direct physical contact. Computing device 305 can also include a display element 310, such as a touch-screen or liquid crystal display (LCD).

The various aspects can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In aspects utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method performed by at least one computing device including a computer processor and a memory, wherein the computer processor is configured to interface via a communication network with a utility customer device, a third party provider, and a customer activity score (CAS) calculation system, the method comprising:

aggregating, by the computer processor, behavior information for each of a plurality of utility customers, the behavior information comprising historic consumption data for at least one consumable resource;

calculating, by the computer processor using the behavior information, a customer activity score (CAS) value for one or more of the utility customers, wherein the CAS value provides a quantitative measure of engagement with one or more online systems for the one or more of the utility customers, wherein the CAS value for a selected customer is further based at least in part on a frequency of interaction by the selected customer with the one or more online systems;

applying, by the computer processor, a machine-learning model to calculate the CAS value for one or more of the plurality of utility customers by providing the behavior information as an input to the machine-learning model, wherein the machine-learning model outputs the CAS value;

tracking, by the computer processor, the CAS values for various customer group and determining a level of engagement with one or more online systems based on tracking metrics for the CAS values for the customers of each group by: comparing the frequency of interaction with the one or more online systems and the CAS value; determining the level of customer engagement with one or more online systems based on the CAS value differences between customers;

wherein for the selected customer, the CAS value is increased based on a higher frequency of interaction with the one or more online systems and the CAS value is decreased based on a lower frequency of interaction with the one or more online systems;

updating, by the computer processor, the CAS value for one or more of the plurality of utility customers based on new behavior information for the one or more of the plurality of utility customers as inputted to the machine-learning model;

generating, by the computer processor, customer content for each customer of a selected group of customers from the plurality of utility customers based on a corresponding CAS value calculated and tracked for each customer, wherein the customer content includes at least a first content version of a website and a second content version for an email;

selecting, by the computer processor, a communication channel for delivery of the customer content to each of the customers based on the corresponding CAS value;

wherein highly engaged utility customers with higher CAS values are provided with the first content version for the website, and poorly engaged utility customers with lower CAS values are provided with the second content version in the email including a hyperlink to one of the online systems and instructions about how to pay utility bills online to help the poorly engaged utility customers become more engaged; and transmitting, by the computer processor using the selected communication channel, the customer content to each associated customer of the selected group of customers, wherein the customer content is transmitted as interactive voice response (IVR) communications, messages in extensible markup language (XML) format, hyperlinks in an email, text messages, or on-device notifications delivered to in-home devices associated with the utility customers.

2. The computer-implemented method of claim 1, further comprising:
ranking two or more of the plurality of utility customers based on their respective CAS values.

3. The computer-implemented method of claim 1, wherein the behavior information further comprises one or more of: digital activity information, or program participation information.

4. The computer-implemented method of claim 1, further comprising:
identifying a combination of one or more programs or products that correlated with higher CAS values for the plurality of utility customers.

5. The computer-implemented method of claim 1, further comprising:
determining a degree of customer sophistication based on a corresponding CAS value for at least one of the plurality of utility customers.

6. The method of claim 1, wherein generating the customer content further includes generating content for selected customers that have a CAS value below a threshold to include suggestions for improving interaction with the one or more online systems.

7. The method of claim 1, wherein selecting the communication channel for a customer includes selecting from either a digital communication channel or a non-digital communication channel based on at least the corresponding CAS value.

8. A system comprising:
one or more computer processors, and
a non-transitory computer-readable medium comprising instructions stored therein, which when executed by the computer processors, causes the computer processors to:

detect and track online engagement interactions that occur on one or more online systems, wherein the online engagement interactions are associated to each of a plurality of utility customers based on engagement with the one or more online systems using a network communication;

wherein the one or more online systems include a website provided by a utility provider and electronic messages, and wherein the online engagement interactions include network interactions with the website and the electronic messages;

generating digital activity information for each of the plurality of utility customers based on the detected online engagement interactions;

receive behavior information for each of the plurality of utility customers, the behavior information comprising historic consumption data for at least one consumable resource and the digital activity information;

calculate, using at least the behavior information, a customer activity score (CAS) for each of the plurality of utility customers, wherein the CAS for a selected customer is based at least in part on a frequency of interaction by the selected customer with the one or more online systems determined from the digital activity information of the selected customer;

wherein for the selected customer, the CAS value is increased based on a higher frequency of interaction with the one or more online systems and the CAS value is decreased based on a lower frequency of interaction with the one or more online systems;

generate customer content for each customer of a selected group of customers from the plurality of utility customers based on a corresponding CAS value calculated for each customer;

select a communication channel for delivery of the customer content to each of the customers from the selected group of customers based on the corresponding CAS value calculated for the customer;

wherein first customers from the selected group of customers with higher CAS values are identified as highly engaged customers and are provided with a first content version of the customer content, and wherein second customers from the selected group of customers with lower CAS values are identified as poorly engaged customers and are provided with a second content version of the customer content including a hyperlink to one of the online systems and instructions about how to pay utility bills online to help the poorly engaged customers become more engaged online; and transmit, by the computer processor using the selected communication channel, the customer content to each associated customer of the selected group of customers, wherein the customer content is transmitted as an interactive voice response (IVR) communication, a message in extensible markup language (XML) format, a hyperlink in an email, a text message, or an on-device notification delivered to in-home devices associated with the utility customers.

9. The system of claim 8, wherein the computer processors are further configured to perform operations comprising:
segmenting the plurality of utility customers into two or more customer groups based on the CAS for each of the plurality of utility customers.

10. The system of claim 8, wherein the computer processors are further configured to perform operations comprising:
ranking two or more of the plurality of utility customers based on their respective CAS values.

11. The system of claim 8, wherein the behavior information further comprises one or more of: digital activity information, or program participation information.

12. The system of claim 8, wherein the computer processors are further configured to perform operations comprising:
identifying a combination of one or more programs or products that correlated with higher CAS values for the plurality of utility customers.

13. The system of claim 8, wherein the computer processors are further configured to perform operations comprising:
determining a degree of customer sophistication based on a corresponding CAS value for at least one of the plurality of utility customers.

14. The system of claim 8, wherein the computer processors are further configured to perform operations comprising:
updating the CAS value for one or more of the plurality of utility customers based on new behavior information for the one or more of the plurality of utility customers.

15. The system of claim 8, wherein the instructions for generating the customer content further include stored instructions, which when executed by the processors, causes the processors to:
generate content for selected customers that have a CAS value below a threshold to include suggestions for improving interaction with the one or more online systems.

16. The system of claim 8, wherein the communication channel is further selected for a customer from either a digital communication channel or a non-digital communication channel based on at least the corresponding CAS value.

17. A non-transitory computer-readable storage medium comprising instructions stored therein, which when executed by one or more processors, cause the processors to perform operations comprising:
detecting and tracking online engagement interactions that occur on one or more online systems, wherein the online engagement interactions are associated to each of a plurality of utility customers based on engagement with the one or more online systems using a network communication;
wherein the one or more online systems include a website provided by a utility provider and electronic messages, and wherein the online engagement interactions include network interactions with the website and actions on the electronic messages;
generating digital activity information for each of the plurality of utility customers based on the detected online engagement interactions including statistics for actions performed on the one or more online systems;
receiving behavior information for each of the plurality of utility customers, the behavior information comprising historic consumption data for at least one consumable resource and the digital activity information;
calculating, using at least the behavior information, a customer activity score (CAS) for each of the plurality of utility customers, wherein the CAS provides a quantitative measure of engagement with one or more online systems for a corresponding customer of the utility customers, wherein the CAS for the corresponding customer is further based at least in part on a frequency of interaction by the corresponding customer with the one or more online systems provided by the utility provider determined from the digital activity data of the corresponding customer;
generating customer content for each customer of a selected group of customers from the plurality of utility customers based on a corresponding CAS value calculated for each customer, wherein the customer content for an associated customer includes at least a first content version or a second content version that is different from the first content version;
wherein highly engaged utility customers with higher CAS values are provided with the first content version, and poorly engaged utility customers with lower CAS values are provided with the second content version which includes instructions about how to pay utility bills online to help the poorly engaged utility customers improve engagement with the one or more online systems;
selecting a communication channel for delivery of the customer content to each of the customers based on the corresponding CAS value calculated for the associated customer; and
transmitting the customer content to each associated customer of the selected group of customers via the communication channel selected for each customer, wherein the customer content is transmitted as an interactive voice response (IVR) communication, a message in extensible markup language (XML) format, a hyperlink in an email, a text message, or an on-device notification delivered to in-home devices associated with the utility customers.

18. The non-transitory computer-readable storage medium of claim 17, the operations further comprising:
segmenting the plurality of utility customers into two or more customer groups based on the CAS for each of the plurality of utility customers.

19. The non-transitory computer-readable storage medium of claim 17, wherein the operations further comprising:
ranking two or more of the plurality of utility customers based on their respective CAS values.

20. The non-transitory computer-readable storage medium of claim 17 wherein selecting the communication channel for a customer includes selecting either a digital communication channel or a non-digital communication channel based on at least the corresponding CAS value.

* * * * *